United States Patent
Sadeghi et al.

(10) Patent No.: US 9,749,425 B2
(45) Date of Patent: *Aug. 29, 2017

(54) APPARATUS, SYSTEM AND METHOD OF TEARING DOWN A MEDIA-AGNOSTIC USB SESSION

(71) Applicant: INTEL CORPORATION, Santa Clara, CA (US)

(72) Inventors: Bahareh Sadeghi, Portland, OR (US); Rafal Wielicki, Gdansk (PL); Elad Levy, Rishon LeZion (IL); Marek Dabek, Gdansk (PL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/998,199

(22) Filed: Dec. 24, 2015

(65) Prior Publication Data

US 2016/0212221 A1    Jul. 21, 2016

Related U.S. Application Data

(63) Continuation of application No. 13/798,458, filed on Mar. 13, 2013, now Pat. No. 9,380,634.

(60) Provisional application No. 61/729,365, filed on Nov. 22, 2012.

(51) Int. Cl.
| | |
|---|---|
| H01L 29/08 | (2006.01) |
| H04L 29/08 | (2006.01) |
| G06F 13/38 | (2006.01) |
| H04W 76/06 | (2009.01) |
| H04L 29/06 | (2006.01) |

(Continued)

(52) U.S. Cl.
CPC .......... *H04L 67/143* (2013.01); *G06F 13/385* (2013.01); *G06F 13/387* (2013.01); *G06F 13/4282* (2013.01); *H04L 67/14* (2013.01); *H04L 69/08* (2013.01); *H04L 69/18* (2013.01); *H04L 69/324* (2013.01); *H04W 76/06* (2013.01); *H04W 76/064* (2013.01); *G06F 1/187* (2013.01)

(58) Field of Classification Search
CPC .......... G06F 1/187; G06F 13/387; H04L 67/14
See application file for complete search history.

(56) References Cited

U.S. PATENT DOCUMENTS

| | | | |
|---|---|---|---|
| 9,380,634 B2 * | 6/2016 | Sadeghi | .............. H04W 76/064 |
| 2002/0159419 A1 | 10/2002 | Morris | |

(Continued)

OTHER PUBLICATIONS

WiGig MAC and PHY Specification Version 1.1. Apr. 2011—Final Specification. pp. 1-442.

(Continued)

*Primary Examiner* — Jeong S Park
(74) *Attorney, Agent, or Firm* — Shichrur & Co.

(57) ABSTRACT

Some demonstrative embodiments include apparatuses, systems and/or methods of tearing down a Protocol Adaptation Layer (PAL) session. For example, an apparatus may include a first PAL communication unit to control a PAL connection, over a PAL, between a first device and a second device, the first PAL communication unit is to control the PAL connection during a session with a second PAL communication unit over a communication link, wherein the first PAL communication unit is to tear down the session according to a tear down procedure.

20 Claims, 5 Drawing Sheets

(51) Int. Cl.
*G06F 13/42* (2006.01)
*G06F 1/18* (2006.01)

(56) References Cited

U.S. PATENT DOCUMENTS

| | | | | |
|---|---|---|---|---|
| 2008/0077725 | A1* | 3/2008 | Yabuki | G06F 13/387 710/305 |
| 2008/0162742 | A1* | 7/2008 | Kong | H04L 41/06 710/19 |
| 2009/0034498 | A1 | 2/2009 | Banerjea et al. | |
| 2009/0265722 | A1* | 10/2009 | Lu | G06F 21/57 719/327 |
| 2010/0130138 | A1 | 5/2010 | Nandagopalan et al. | |
| 2010/0205334 | A1* | 8/2010 | Tominaga | G06F 13/387 710/65 |
| 2010/0318699 | A1* | 12/2010 | Gao-Saari | G06F 13/102 710/72 |
| 2011/0159469 | A1* | 6/2011 | Hwang | A61B 5/222 434/247 |
| 2012/0311207 | A1 | 12/2012 | Powers et al. | |
| 2013/0163489 | A1* | 6/2013 | Lee | H04W 4/18 370/310 |
| 2013/0266073 | A1* | 10/2013 | Macinnis | H04N 7/56 375/240.24 |
| 2013/0272272 | A1 | 10/2013 | Sudak et al. | |
| 2014/0016567 | A1 | 1/2014 | Lu et al. | |
| 2014/0047141 | A1 | 2/2014 | Sadeghi et al. | |
| 2014/0143436 | A1 | 5/2014 | Sadeghi et al. | |
| 2014/0269543 | A1 | 9/2014 | Li et al. | |

OTHER PUBLICATIONS

IEEE Std 802.11™-2012. Part 11: Wireless LAN Medium Access Control (MAC) and Physical Layer (PHY) Specifications, IEEE Standard for Information technology. Telecommunications and information exchange between systems Local and metropolitan area networks-Specific requirements, Mar. 29, 2012, 2793 pages.

Wi-Fi Alliance Technical Committee P2P Task Group. Wi-Fi Peer-to-Peer (P2P) Technical Specification. Version 1.2; Dec. 14, 2011; 160 pages.

Universal Serial Bus Mass Storage Class—Bulk-Only Transport, Revision 1.0, Sep. 31, 1999; 22 pages.

Universal Serial Bus Specification, Revision 2.0; Apr. 27, 2000, 650 pages.

Universal Serial Bus 3.0 Specification (including errata and ECNs through May 1, 2011); Revision 1.0; Jun. 6, 2011, 531 pages.

Office Action for U.S. Appl. No. 13/798,458, mailed on Jun. 1, 2015, 18 pages.

Notice of Allowance for U.S. Appl. No. 13/798,458, mailed on Feb. 26, 2016, 11 pages.

Final Office Action for U.S. Appl. No. 13/798,458, mailed on Nov. 25, 2015, 11 pages.

U.S. Appl. No. 14/998,198, filed Dec. 24, 2015, 53 pages.

Office Action for U.S. Appl. No. 14/998,198, mailed on Dec. 12, 2016, 19 pages.

\* cited by examiner

US 9,749,425 B2

APPARATUS, SYSTEM AND METHOD OF TEARING DOWN A MEDIA-AGNOSTIC USB SESSION

CROSS REFERENCE

This application is a Continuation Application of U.S. patent application Ser. No. 13/798,458, filed on Mar. 13, 2013, which claims the benefit of and priority from U.S. Provisional Patent application No. 61/729,365 entitled "Apparatus, System, and Method of Disconnecting a Protocol Adaptation Layer (PAL) Link", filed Nov. 22, 2012, the entire disclosures of which are incorporated herein by reference.

TECHNICAL FIELD

Embodiments described herein generally relate to tearing down a Protocol Adaptation Layer (PAL) session.

BACKGROUND

Some wireless communication technologies may be configured for communication of various dedicated services.

For example, the Wireless-Gigabit (WiGig) technology, e.g., according to the *Wireless Gigabit Alliance, Inc WiGig MAC and PHY Specification Version* 1.1, *April* 2011, *Final specification*, is designed to carry multiple dedicated services, such as audio-visual (A/V) and input output (I/O).

The WiGig Alliance (WGA) has defined a set of Protocol Abstraction Layers (PALs), e.g., a WiGig Serial Extension (WSE) PAL and a WiGig Display Extension (WDE) PAL, that standardize the method of transporting traffic of specific industry-standard protocols, e.g. Universal Serial Bus (USB) and DisplayPort, over the WiGig media access control (MAC) layer.

The WSE defines a WSE host communicating with a WSE device over a WiGig wireless link interface. The WSE host can connect and control several WSE devices. Each WSE device can include several USB ports, and each USB port can be attached to a USB device or be extended to several ports via a USB hub.

Since USB devices and/or USB hosts may be configured for communicating over a physical medium, e.g., a USB cable, there may be a problem to perform some operations, e.g., in an efficient seamless and/or transparent manner, via the WSE PAL.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DESCRIPTION OF EMBODIMENTS

Figure 1:
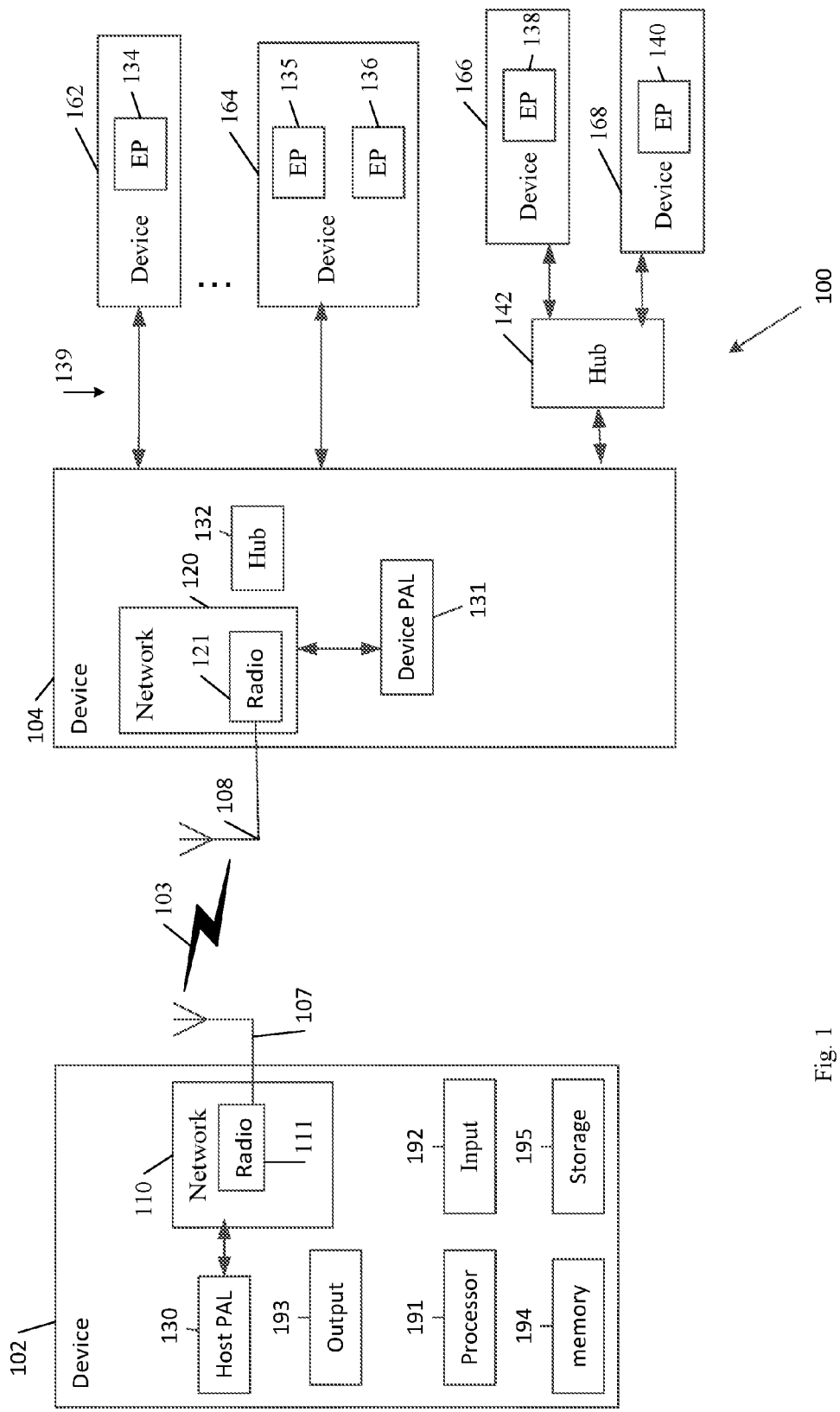
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA or WiGig) specifications (*Wireless Gigabit Alliance, Inc WiGig MAC and PHY Specification Version* 1.1, April 2011, *Final specification*) and/or future versions and/or derivatives thereof, devices and/or networks operating in accordance with existing WiGig Serial Extension (WSE) protocols (*WiGig Serial Extension (WSE) Specification Draft* 1.02, August 2012) and/or future versions and/or derivatives thereof, devices and/or networks operating in accordance with existing WiGig Display Extension (WDE) protocols (*WDE Draft Specification* 1.04, August 2012) and/or future versions and/or derivatives thereof, devices and/or networks operating in accordance with existing WiGig Bus Extension (WBE) protocols (*WiGig Bus Extension Spec (WBE), Version* 1.0 June 2011) and/or future versions and/or derivatives thereof, devices and/or networks operating in accordance with existing WiGig Secure Digital (SD) Extension (WSD) protocols (*WiGig SD Extension (WSD) PAL Specification Draft* 1.0 August 2012) and/or future versions and/or derivatives thereof, devices and/or networks operating in accordance with existing Bulk Only Transfer (BOT) Protocols (*Universal Serial Bus (USB) Mass Storage Class Bulk-Only Transport, Revision* 1.0, Sep. 31, 1999) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications*, Mar. 29, 2012; IEEE802.11 task group ac (TGac) ("*IEEE*802.11-09/0308*r*12 —*TGac Channel Model Addendum Document*"); IEEE 802.11 *task group ad* (*TGad*) (*IEEE P*802.11*ad/D*9.0 *Draft Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 5: *Enhancements for Very High Throughput in the* 60 *GHz Band*)), and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems; IEEE-Std* 802.16*e*, 2005 *Edition, Physical and Medium Access Control Layers for Combined Fixed and Mobile Operation in Licensed Bands; amendment to IEEE Std* 802.16-2009, *developed by Task Group m*) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), WiGig, Wi-Fi, Internet-Protocol (IP), Wi-Max, ZigBee™, Ultra-Wideband (UWB), Global System for Mobile communication (GSM), 3rd Generation Partnership Project (3GPP), 2G, 2.5G, 3G, 3.5G, Long Term Evolution (LTE), LTE advanced, Fifth Generation (5G) mobile networks, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, a WiFi band, a P2P band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The term "beamforming", as used herein, may relate to a spatial filtering mechanism, which may be used at a transmitter and/or a receiver to improve the received signal power or signal-to-noise ratio (SNR) at an intended receiver.

The phrase "non-access-point (non-AP) station (STA)", as used herein, may relate to a STA that is not contained within an AP.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the DMG band.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

A wireless P2P wireless communication network ("P2P network" or "P2P group") may include a plurality of wireless communication devices capable of supporting device-to-device communication.

The phrase "Protocol Adaptation Layer (PAL)", as used herein, may include an abstraction layer configured to enable transporting traffic of at least one predefined protocol over a communication link. The predefined standard may include, for example, a specific industry-standard protocol, e.g. USB, DisplayPort, and the like. The PAL may be above a data link layer, for example, a MAC layer, and/or above a transport layer, e.g., a Transmission Control Protocol (TCP) or User Datagram Protocol (UDP), which is above the data link layer. In one example, the data link layer may include, for example, a MAC layer of a wireless link, e.g., a WiFi MAC layer, a WiGig MAC layer, a P2P MAC layer, and the like. In another example, the PAL may be above a transport layer, e.g., a TCP or UDP, which may be configured for transporting traffic over an IP network, e.g., a wired or wireless Internet link and/or Ethernet link.

Some demonstrative embodiment are described herein with respect to a PAL connection over a wireless communication link, for example, a WiGig link, e.g., as described below. However, other embodiments may include a PAL connection over any other wired or wireless communication MAC layer link, e.g., an IP link.

The phrase "PAL communication unit", as used herein, may include a communication element to manage a PAL connection between a first architectural element, for example, a PAL host, e.g., a USB host, and a second architectural element, for example, a PAL device, e.g., a USB device, over a communication link, e.g., a MAC layer link or a transport layer link, between the PAL communication unit and another PAL communication unit.

In some demonstrative embodiments, the PAL communication unit (also referred to as "PAL manager" or "PAL controller") may perform the functionality of, may include, or may be implemented as part of a WSE Service Set (WSS). For example, the PAL communication unit may perform at least part of the functionality of a WSE device or a WSE host, e.g., as described below. In other embodiments, the PAL communication unit may perform the functionality of any other PAL device, element and/or module.

The phrase "WSE device", as used herein, may include, for example, a WSE architectural element that integrates, and/or is associated with, at least one device, e.g., a USB device, and manages transfers, e.g., USB transfers, targeting the integrated device over a network connection. In one example, the integrated device may be connected, for example, through a wired USB, e.g., USB cable, USB chip-to-chip interconnect, and/any other technologies. In one example, the integrated device may be presented through the WSE device to a host as a USB device compliant with a USB specification, e.g., the USB 2.0 and/or USB 3.0 Specifications.

In one example, the WSE device may optionally include any computing platform, e.g., a portable device, which houses and/or performs the functionality of the WSE device and, optionally, one or more additional elements, e.g., drivers and/or application software, configured to perform the functionality of a peripheral device. In other embodiments, the WSE device may include and/or may be implemented by any other portable or non-portable device.

In some demonstrative embodiments, the WSE device may include USB device logic, e.g., for communicating with a USB device according to a USB Specification, a WSE device PAL, e.g., to control communication over the PAL, and a network interface, e.g., to communicate over the communication link. For example, the WSE device PAL may interface between the USB device logic and the network interface, e.g., in a transparent manner. In other embodiments, the WSE device may include any other elements. In one example, the PAL communication unit may perform the functionality of at least the WSE device PAL.

The phrase "WSE host", as used herein, may include an architectural element of the WSE PAL that includes a communication architecture, e.g., a WiGig MAC and PHY, and USB host logic, e.g., as defined by a USB specification, e.g., the USB 2.0 and/or USB 3.0 Specifications.

In one example, the WSE host may optionally include any computing platform, e.g., a personal computer, which houses and/or performs the functionality of the WSE host and, optionally, one or more additional elements, e.g., drivers and/or application software, configured to perform the functionality of a host device. In other embodiments, the WSE host may include and/or may be implemented by any other portable or non-portable device.

In some demonstrative embodiments, the WSE host may include USB host logic, e.g., for communicating with a USB host according to a USB Specification, a WSE host PAL, e.g., to control communication over the PAL, and a network interface, e.g., to communicate over the communication link. For example, the WSE host PAL may interface between the USB host logic and the network interface, e.g., in a transparent manner. In other embodiments, the WSE host may include any other elements. In one example, the PAL communication unit may perform the functionality of at least the WSE host PAL.

An endpoint may include, for example, an architectural element, which is associated with a first device, which in turn is configured to interface between the endpoint and a second device over a communication link. For example, the endpoint may be integrated as part of the first device or connected to the first device via one or more other devices and/or connections. The endpoint may be implemented, for example, using any technology, e.g., software, hardware and/or any combination thereof. The first device may include and/or interface between one or more endpoints and the second device.

In one example, the first device may include a WSE device and the second device may include a WSE host. For example, the endpoint may belong to a USB device, e.g., a USB device, which may be integrated into the WSE device or connected, e.g., through a wired USB connection, to the WSE device, e.g., via a hub integrated into the WSE device.

According to this example, the endpoint may be uniquely identified by the WSE host. For example, a combination of a WSE device address of the WSE device and a WSE EP handle assigned to the endpoint may uniquely identify a USB device endpoint within a WSE service set.

In other examples, the first and second devices may include any other, e.g., non-WSE and/or non-USB, device and the endpoint may perform the functionality of any other, e.g., non-USB and/or non-WSE, element.

Reference is now made to FIG. 1, which schematically illustrates a block diagram of a system 100, in accordance with some demonstrative embodiments.

As shown in FIG. 1, in some demonstrative embodiments, system 100 may include a communication network including one or more communication devices, e.g., communication devices 102 and/or 104, capable of communicating content, data, information and/or signals over a communication medium, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, devices 102 and/or 104 may include, for example, a PC, a desktop computer, a mobile computer, a laptop computer, a notebook computer, a tablet computer, an Ultrabook™, a server computer, a media center, a mobile internet device, a handheld computer, a handheld device, a storage device, a mass storage device, a USB mass storage (UMS) device, a hard drive, an optical drive, a flash memory device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102 and/or 104 may include network interfaces 110 and 120, respectively, to perform communication over a communication network between communication devices 102 and 104 and/or with one or more other devices, e.g., as described below.

Devices 102 and/or 104 may also include, for example, one or more of a processor 191, an input unit 192, an output unit 193, a memory unit 194, and a storage unit 195. Wireless communication devices 102 and/or 104 may optionally include other suitable hardware components and/or software components. In some demonstrative embodiments, some or all of the components of one or more of wireless communication devices 102 and/or 104 may be enclosed in a common housing or packaging, and may be interconnected or operably associated using one or more wired or wireless links. In other embodiments, components of one or more of wireless communication devices 102 and/or 104 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of wireless communication devices 102 and/or 104 and/or of one or more suitable applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by wireless communication devices 102 and/or 104.

In some demonstrative embodiments, network interfaces 110 and/or 120 may include wireless communication units, e.g., including radios 111 and 121, to communicate over a wireless communication medium. For example, radios 111 and/or 121 may include, or may be associated with, one or more antennas 107 and/or 108, respectively. Antennas 107 and/or 108 may include any type of antennas suitable for transmitting and/or receiving wireless communication signals, blocks, frames, transmission streams, packets, messages and/or data. For example, antennas 107 and/or 108 may include any suitable configuration, structure and/or arrangement of one or more antenna elements, components, units, assemblies and/or arrays. Antennas 107 and/or 108 may include, for example, antennas suitable for directional communication, e.g., using beamforming techniques. For example, antennas 107 and/or 108 may include a phased array antenna, a single element antenna, a set of switched beam antennas, and/or the like. In some embodiments, antennas 107 and/or 108 may implement transmit and receive functionalities using separate transmit and receive antenna elements. In some embodiments, antennas 107 and/or 108 may implement transmit and receive functionalities using common and/or integrated transmit/receive elements.

In some demonstrative embodiments, radios 111 and/or 121 may include one or more wireless transmitters, receivers and/or transceivers able to send and/or receive wireless communication signals, RF signals, frames, blocks, transmission streams, packets, messages, data items, and/or data. For example, radios 111 and/or 121 may include or may be implemented as part of a wireless Network Interface Card (NIC), and the like.

In some demonstrative embodiments, devices 102 and 104 may establish a communication link 103. Link 103 may be configured for communication over a data link layer, e.g., the MAC layer, a logical link control (LLC) and/or a transport layer. Link 103 may include an uplink and/or a downlink. For example, the uplink may include a link for communicating data from device 104 to device 102, and/or the downlink may include a link for communicating data from device 102 to device 104. The downlink may include, for example, a unidirectional link from an AP to one or more non-AP stations (STAs) or a unidirectional link from a non-AP Destination STA to a non-AP Source STA. The uplink may include, for example, a unidirectional link from a non-AP STA to an AP or a unidirectional link from a non-AP Source STA to a non-AP Destination STA.

In some demonstrative embodiments, link 103 may include a wireless communication link, for example, a WiGig link, e.g., as described below. In other embodiments, link 103 may include any other wireless or wired link, e.g., an IP link. According to these embodiments, network interfaces 110 and/or 120 may include any suitable communication unit, e.g., a wired or wireless communication unit, to communicate over the communication network.

In some demonstrative embodiments, devices 102 and 104 may form, or may be part of, a wireless communication network. The wireless communication network may include, for example, a P2P network or any other network.

In some demonstrative embodiments, devices 102 and/or 104 may perform the functionality of DMG stations ("DMG STA"). For example, communication devices 102 and/or 104 may be configured to communicate over the DMG band.

In some demonstrative embodiments, device 102 may include a mobile device and device 104 may include a docking device to connect device 102 to one or more other devices ("peripherals"), for example, including one or more USB devices, e.g., devices 162, 164, 166 and/or 168, and/or any other device.

For example, device 102 may include, or may be included as part of a mobile or portable device, for example, a mobile computer, a laptop computer, a notebook computer, a tablet computer, an Ultrabook™, a Smartphone, a handheld computer, a handheld device, a PDA device, a handheld PDA device, an on-board device, an off-board device, a hybrid device, e.g., combining cellular phone functionalities with PDA device functionalities, a consumer device, a vehicular device, a non-vehicular device, a cellular telephone, a PCS device, a PDA device which incorporates a wireless communication device, a mobile or portable GPS device, a relatively small computing device, a non-desktop computer, a CSLL device, a UMD, a UMPC, a MID, an "Origami" device or computing device, a device that supports DCC, a context-aware device, a video device, an audio device, an A/V device, a data source, a Digital Still camera (DSC), a media player, or the like.

In one example, device 104 may include a docking device configured to connect between device 102 and devices 162, 164, 166 and/or 168 via one or more interfaces 139, for example, serial interfaces, e.g., USB interfaces and/or any other interface. Devices 162, 164, 166 and/or 168 may include for example, a mass storage device, e.g., a USB mass storage (UMS) device, a hard drive, an optical drive, a flash memory device, and the like.

In some demonstrative embodiments, device 104 may be connected to devices 162, 164, 166 and/or 168 via one or more USB interfaces 139 supporting one or more data transfer rates. For example, device 104 may be connected to one or more of devices 162, 164, 166 and/or 168 via a first USB interface 139 supporting a first data transfer rate, e.g., a USB1.1 interface supporting a data transfer rate of 12 Mega bit per second (Mbps), device 104 may be connected to one or more of devices 162, 164, 166 and/or 168 via a second USB interface 139 supporting a second data transfer rate, e.g., a USB2 interface supporting a data rate of 480 Mbps, and/or device 104 may be connected to one or more of devices 162, 164, 166 and/or 168 via a third USB interface 139 supporting a third data transfer rate, e.g., a USB3 interface supporting a data transfer rate of up to 4.8 Giga bit per second (Gbps).

In some demonstrative embodiments, device 104 may include a hub 132, e.g., a USB hub, to connect between device 104 and one or more of devices 162, 164, 166 and 168. Additionally or alternatively, device 104 may be connected to one or more of devices 162, 164, 166 and 168 via any USB tree, which may include, for example, one or more USB hubs 142. For example, device 102 may include, or may be connected to, one or more USB ports, and each USB port may be connected to a USB device or be extended to several ports via USB hub 132 and/or USB hub 142.

In some demonstrative embodiments, devices 162, 164, 166 and/or 168 may perform the functionality of one or more Endpoints (EPs). For example, a USB device may perform the functionality of one EP or more than one EP. In one example, device 162 may perform the functionality of an EP 134, device 164 may perform the functionality of an EP 135 and an EP 136, device 166 may perform the functionality of an EP 138, and/or device 168 may perform the functionality of an EP 138.

In some demonstrative embodiments, device 102 may include a PAL communication unit 130, and device 104 may include a PAL communication unit 131. PAL communication units 103 and 131 may be configured to manage a PAL connection between devices 102 and 104 over link 103.

In some demonstrative embodiments, devices 102 and 104 may communicate over link 103 according to a WiGig protocol.

In some demonstrative embodiments, devices 102 and 104 may be configured for communication of various dedicated services. For example, the WiGig technology is designed to carry multiple dedicated services, such as audio-visual (A/V) and input output (I/O).

Some demonstrative embodiments are described herein with reference to communicating a data stream including USB data over a wireless communication link according to a WSE protocol. However, other embodiments may be implemented with respect to communicating any other suitable data over any other communication link, according to any other communication protocol and/or over any other layer or PAL.

In some demonstrative embodiments, device 102 may perform the functionality of a USB host and device 104 may perform the functionality of a USB device.

In some demonstrative embodiments, PAL communication unit 130 may perform the functionality of a WSE host and PAL communication unit 131 may perform the functionality of a WSE device.

In some demonstrative embodiments, PAL communication units 130 and 131 may communicate USB traffic over the WSE PAL via link 103. The USB traffic may include, for example, non-periodic (NP) traffic, e.g., bulk and/or control traffic, and/or periodic traffic, e.g., Isochronous and/or Interrupt traffic, which may be communicated by the EPs 134, 135, 136, 138 and/or 140.

In some demonstrative embodiments, the USB traffic may include traffic ("USB IN") delivered from the EPs the EPs 134, 135, 136, 138 and/or 140, via device 104, to device 102, and/or traffic ("USB OUT") delivered from device 102, via device 104, to the EPs the EPs 134, 135, 136, 138 and/or 140.

In some demonstrative embodiments, the USB PAL may enable transport of USB data over media other than USB cable, for example, wireless links, e.g., Wi-Fi or WiGig links, or wired links, e.g., Ethernet. The USB PAL may directly interface with network interfaces 110 and 120, e.g., to replace a network layer in the Open Systems Interconnection (OSI) model, or may be an IP application, interfacing with an IP (e.g., TCP/IP or UDP/IP) stack.

In some demonstrative embodiments, PAL communication unit 130 and PAL communication unit 131 may be configured to enable media-agnostic connectivity of a PAL between devices 102 and 104.

In some demonstrative embodiments, PAL communication unit 130 and PAL communication unit 131 may be configured to enable connectivity of the PAL between devices 102 and 104 over a wireless communication link, for example, a WiGig link, e.g., as described below. However, in other embodiments, PAL communication unit 130 and PAL communication unit 131 may be configured to enable media-agnostic connectivity of the PAL between devices 102 and 104 over any other medium, for example, a Wi-Fi link, an IP link, e.g., internet, Ethernet, over wire or wireless, and the like.

In some demonstrative embodiments the USB PAL may replace a USB physical cable.

For example, PAL communication units 130 and 131 may be configured to interface, e.g., over link 103, between USB host logic, for example, a USB driver at a host platform, e.g., a USB device interface (USBDI) of device 102, and a USB controller of device 104.

According to this example, the combination of PAL communication unit 130, network interface 110, network interface 120, and PAL communication unit 131 may be configured to replace and/or emulate the USB physical cable for connecting between a host device, e.g., device 102, and a USB device, e.g., included by or connected to device 104.

In some demonstrative embodiments, PAL communication unit 130 and/or PAL communication unit 131 may be configured to enable bus specific functions, e.g., a disconnect function, for example, in a media agnostic USB, e.g., which may configured to replace the USB cable for connecting between devices 102 and 104.

In some demonstrative embodiments, in media agnostic USB, there may exist a PAL session, e.g., a wireless session, between PAL communication unit 130 and PAL communication unit 131, e.g., in addition to a USB specified session between the USB host logic of device 102 and every USB device under control of the USB host logic, e.g., devices 162, 164, 166 and/or 168.

In some demonstrative embodiments, PAL communication unit 130 may communicate with PAL communication unit 131 during a session ("WSE session") between the WSE device and WSE host.

In some demonstrative embodiments, PAL communication unit 130 may perform host functions specific to media agnostic USB including, for example, creating PAL messages and interfaces with lower layers, e.g., transport, data link, and/or MAC layers. PAL communication unit 131 may be a counterpart of PAL communication unit 130, and may, for example, manages the interactions with the USB devices, e.g., which may be "behind" PAL communication unit 131.

In some demonstrative embodiments, link 103 between PAL communication unit 130 and PAL communication unit 131 may be disconnected.

In some demonstrative embodiments, PAL communication unit 130 and/or PAL communication unit 131, may be configured to tear down the session, e.g., the WSE session, between PAL communication units 130 and 131 according to a tear down procedure, e.g., as described below.

In some demonstrative embodiments, the link 103 between PAL communication unit 130 and PAL communication unit 131 may be disconnected by an implicit tear down, for example, as a result of the loss of the wireless communication connectivity between devices 102 and 104. For example, the link 103 between devices 102 and 104 may be disconnected, e.g., due to device 102 and/or device 104 moving out of range of one another.

In one example, an implicit tear down of a WSE session between a WSE host, e.g., device 102, and a WSE device, e.g., device 104, may occur, for example, when the communication between the WSE host and the WSE device is inhibited.

In some demonstrative embodiments, the communication link 103 between PAL communication unit 130 and PAL communication unit 131 may be disconnected by an explicit tear down.

In one example, an explicit tear down of a WSE session between a WSE host, e.g., device 102, and a WSE device, e.g., device 104, may occur, for example, when the WSE host and/or WSE device chooses to tear down the WSE session. For example, the explicit tear down may occur when a user of device 102 and/or when a user of device 104 performs a platform specific operation to indicate the session tear down.

In one example, a WSE host, e.g., PAL communication unit 130, may trigger disconnection of a WSE device, e.g., PAL communication unit 131, and, consequently, the USB device(s) behind the WSE device.

In another example, the WSE device may trigger the disconnection from the WSE host.

In some demonstrative embodiments, a solution for supporting disconnect over media other than USB cable, may define mechanisms for communicating the intention of the host to remove a specific USB device. Such a solution may lack a mechanism for dismantling the session between the host PAL and the device PAL.

In some demonstrative embodiments, the device PAL and/or Host PAL may be configured to utilize a disconnection mechanism for dismantling the session between the host PAL and the device PAL.

Some demonstrative embodiments may be utilized to provide a solution, e.g., a comprehensive solution, for dismantling the session between the device PAL and the host PAL, e.g., for media-agnostic USB.

In some demonstrative embodiments, PAL communication unit 130 and/or PAL communication unit 131 may be configured to utilize one or more mechanisms for implicit and/or explicit teardown of the session, e.g., WSE session, between the host USB PAL and the device USB PAL.

In some demonstrative embodiments, a first PAL communication unit communicating with a second PAL communication unit over a PAL session between the first and second PAL communication units may be configured to tear down the PAL session between the PAL communication units, e.g., as described in detail below. In one example, the first PAL communication unit may include PAL communication unit 130 and the second PAL communication unit may include PAL communication unit 131. In another example, the first PAL communication unit may include PAL communication unit 131 and the second PAL communication unit may include PAL communication unit 130.

In some demonstrative embodiments, PAL communication units 130 and/or 131 may be configured to initiate an implicit tear down of the session responsive to a loss of connection over communication link 103.

In some demonstrative embodiments, PAL communication unit 130 may emulate to device 102 a disconnection between the devices 102 and 104; and/or PAL communication unit 131 may emulate to device 104 a disconnection between the devices 102 and 104.

In some demonstrative embodiments, PAL communication unit 130 may locally handle actions from device 102 resulting from the emulated disconnection; and/or PAL communication unit 131 may locally handle actions from device 104 resulting from the emulated disconnection.

In some demonstrative embodiments, PAL communication unit 130 may perform the functionality of the WSE host, which may emulate to a USB host of device 102 an event representing a disconnection of a USB device. The emulated event may include, for example, an emulated port status change event equivalent to unplugging a wired USB device from a root port, e.g., as described below.

In some demonstrative embodiments, PAL communication unit 131 may perform the functionality of the WSE device, which may emulate to a USB device, e.g., hub 132 and/or devices 162, 164, 166 and/or 168, an event representing a removal of the USB device.

In some demonstrative embodiments, PAL communication units 130 and/or 131 may be configured to initiate an explicit tear down of the session, e.g., as described below.

In some demonstrative embodiments, the explicit tear down procedure may include a host initiated tear down procedure, e.g., initiated by a USB host of device 102.

In some demonstrative embodiments, PAL communication unit 130 may communicate with PAL communication unit 131 a disconnect request to explicitly terminate the session, e.g., as described in detail below.

In some demonstrative embodiments, PAL communication unit 130 may communicate with PAL communication unit 131 a disconnect response, for example, in response to the disconnect request, e.g., as described in detail below.

In some demonstrative embodiments, PAL communication unit 131 may perform the functionality of a WSE device, and PAL communication unit 130 may perform the functionality of a WSE host, e.g., as described below.

In some demonstrative embodiments, the WSE device may receive from the WSE host a disconnect request to explicitly terminate the session between the WSE device and the WSE host. The WSE device may transmit to the WSE host a disconnect response, e.g., in response to the disconnect request.

In some demonstrative embodiments, PAL communication unit 130 may emulate to device 102, e.g., to a USB host of device 102, an event representing a disconnection of a USB device.

In some demonstrative embodiments, the emulated event may include an emulated port status change event equivalent to unplugging a wired USB device from a root port.

In some demonstrative embodiments, PAL communication unit 131 may locally handle port manipulation actions created as a result of the emulated port status change event.

In some demonstrative embodiments, PAL communication unit 130 may initiate a device removal procedure for removal of the USB device.

In some demonstrative embodiments, the explicit tear down procedure may include a device initiated tear down procedure, e.g., initiated by device 104 and/or a USB device.

In some demonstrative embodiments, PAL communication unit 131 may transmit to PAL communication unit 130 a disconnect notification request, for example, subsequent to receiving an explicit WSE disconnect trigger, e.g., from the USB device.

In some demonstrative embodiments, PAL communication unit 130 may receive from PAL communication unit 131 the disconnect notification, and may transmit to PAL communication unit 131 a response to acknowledge the disconnect notification request.

In some demonstrative embodiments, PAL communication unit 130 may emulate a port status change event to a USB host of device 102, e.g., subsequent to communication of the disconnect notification response.

In some demonstrative embodiments, PAL communication unit 130 and/or PAL communication unit 131 clear all resources allocated for the session, e.g., as part of the implicit or explicit teardown procedure.

Figure 2:
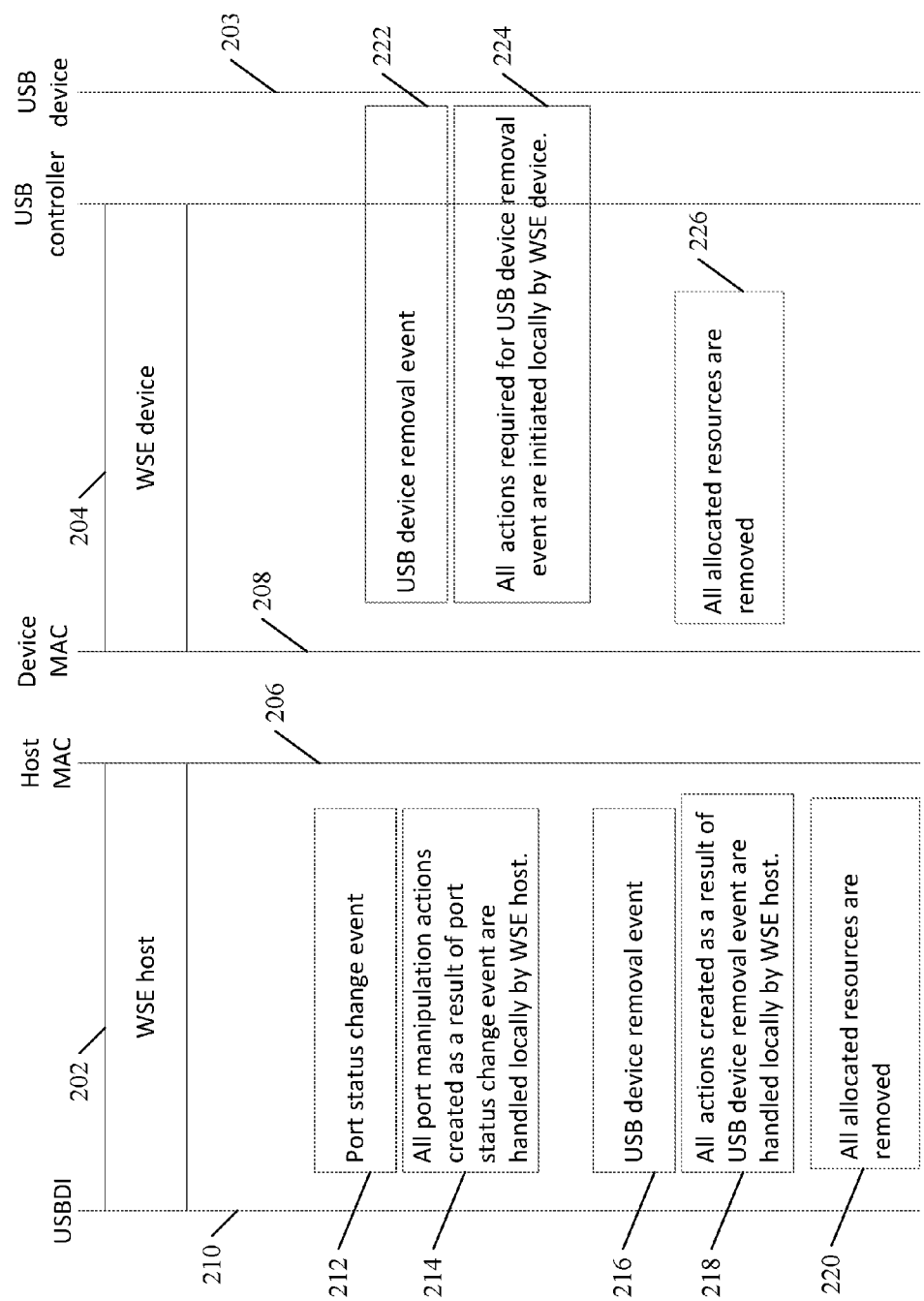
FIG. 2 schematically illustrates an implicit tear down mechanism, in accordance with some demonstrative embodiments.

FIG. 2 schematically illustrates an implicit tear down mechanism, in accordance with some demonstrative embodiments. For example, one or more operations of the mechanism of FIG. 2 may be performed by a WSE device 204 and/or a WSE host 202 to tear down a session between WSE host 202 and WSE device 204. For example, PAL communication unit 130 (FIG. 1) may perform the functionality of the WSE host 202 and/or PAL communication unit 131 (FIG. 1) may perform the functionality of the WSE device 204.

In some demonstrative embodiments, the implicit teardown may be initiated locally, e.g., by the WSE host 202 and/or the WSE device 204.

In some demonstrative embodiments, the implicit tear down may be initiated, for example, when either or both of the WSE host 202 and WSE device 204 detects loss of the communication link between the WSE host 202 and WSE device 204, e.g., link 103 (FIG. 1); and/or when either or both of the WSE host 202 and WSE device 204 is notified by a lower layers of the loss of the link, e.g., a host MAC layer 206 notifies the WSE host 202 of loss of the communication link and/or a device MAC layer 208 notifies the WSE device 204 of loss of the communication link.

In some demonstrative embodiments, in the implicit session tear down the WSE host 202 may emulate, e.g., to USB host system software associated with a USBDI 210, a port status change event 212, which may be equivalent to unplugging of a wired USB device from one of the root ports.

In some demonstrative embodiments, the WSE host 202 may locally handle one or more actions 214, e.g., all actions resulting from the port status change event. For example, WSE host 202 may receive, e.g., from the USB host system software, one or more USB events triggering one or more actions corresponding to the emulated port status change. WSE host 202 may be configured to locally handle the USB events, e.g., by emulating to the USB host any actions required to be performed by the USB events, e.g., in accordance with the USB 2.0 and/or USB 3.0 Specifications.

In some demonstrative embodiments, the WSE host 202 may initiate USB device removal/disconnect by initiating a USB device removal event 216, e.g., following the port status change event.

In some demonstrative embodiments, the WSE host 202 may locally handle 218 one or more actions, e.g., all actions, resulting from the USB device removal event.

In some demonstrative embodiments, the WSE host 202 may clear on or more resources 220, e.g., all resources, allocated to the USB device 203 and/or one or more resources, e.g., all resources, allocated to the WSE device 204.

In some demonstrative embodiments, the WSE device 204 may be configured to emulate USB device removal event 222, e.g., to the USB device 203.

In some demonstrative embodiments, the WSE device 204 may be configured to locally handle one or more actions 224, e.g., all actions, corresponding to the emulated USB device removal event.

In some demonstrative embodiments, the WSE device 204 may clear on or more resources 226, e.g., all resources, allocated to the session, which is torn down.

Figure 3:
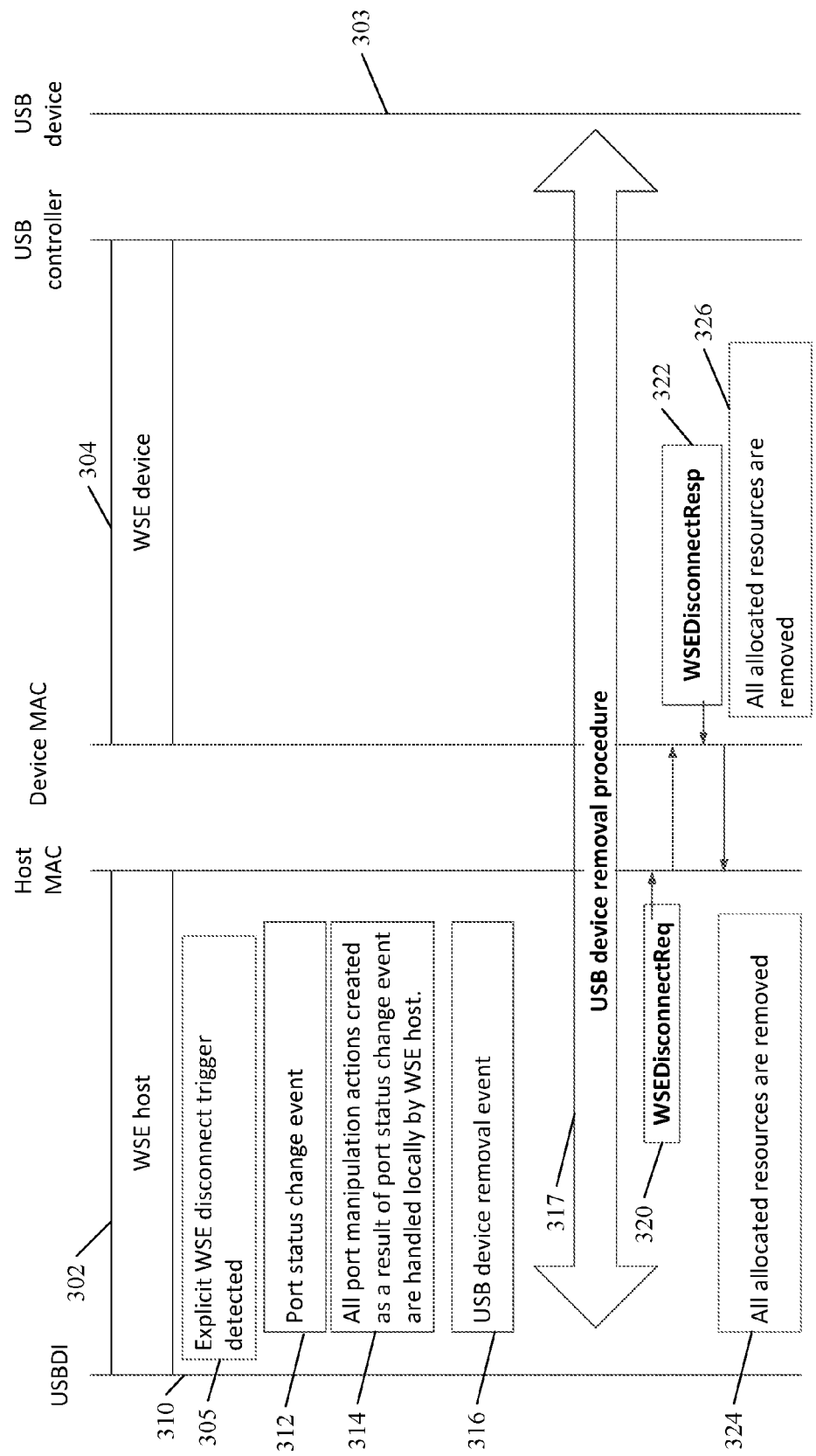
FIG. 3 schematically illustrates a host-initiated tear down mechanism, in accordance with some demonstrative embodiments.

FIG. 3 schematically illustrates a host-initiated tear down mechanism, in accordance with some demonstrative embodiments. For example, one or more operations of the mechanism of FIG. 3 may be performed by a WSE device 304 and/or a WSE host 302 to tear down a session between WSE host 302 and WSE device 304. For example, PAL communication unit 130 (FIG. 1) may perform the functionality of the WSE host 302 and/or PAL communication unit 131 (FIG. 1) may perform the functionality of the WSE device 304.

In some demonstrative embodiments, the host-initiated tear down may emulate and/or be equivalent to ejecting a USB device 303.

In some demonstrative embodiments, in the host-initiated session tear down, the dismantling of the session between WSE host 302 and WSE device 304 may be initiated by a user or an application on a WSE host platform including the WSE host. For example, the host platform may indicate, e.g., via a USBDI 310, an explicit WSE disconnect trigger 305 to the WSE host 302, to indicate that the USB device 303 is to be disconnected.

In some demonstrative embodiments, the trigger may prompt WSE host 302 to emulate a port status change event 312, e.g., equivalent to unplugging of a wired USB device, e.g., device 303, from one of the root ports.

In some demonstrative embodiments, the WSE host 302 may locally handle one or more actions 314, e.g., all actions, resulting from the port status change event, e.g., as described above with reference to FIG. 2.

In some demonstrative embodiments, the WSE host 302 may initiate USB device removal/disconnect by initiating a USB device removal event 316, e.g., following the port status change event.

In some demonstrative embodiments, WSE host 302 and/or WSE device 304 may be configured to perform a USB device removal procedure 317 to remove USB device 303, e.g., in response to the USB device removal event.

For example, as shown in FIG. 3, the port status change may trigger the USB device removal event and consequently the USB device removal/disconnect procedure.

In some demonstrative embodiments, WSE host 302 may transmit a Disconnect Request ("WSE Device Disconnect Request") message 320 to WSE device 304, e.g., following successful completion of the USB device removal procedure by WSE host 302. The Disconnect Request message 320 may indicate that the session between WSE host 302 and WSE device 304 is to be explicitly terminated.

In some demonstrative embodiments, WSE device 304 may transmit to WSE host 302 a Disconnect Response ("WSE Device Disconnect Response") message 322, e.g., in response to the Disconnect Request message 320.

In some demonstrative embodiments, WSE host 302 may clear one or more resources 324, e.g., all resources, allocated to the USB device 303 and/or WSE device 304, e.g., following receipt of the Disconnect Response message 322. The resources may include, for example, handles, and the like.

In some demonstrative embodiments, WSE device 304 may clear one or more resources 326, e.g., all allocated resources, allocated for the session, for example, after successful transmission of the Disconnect Response message 322.

Figure 4:
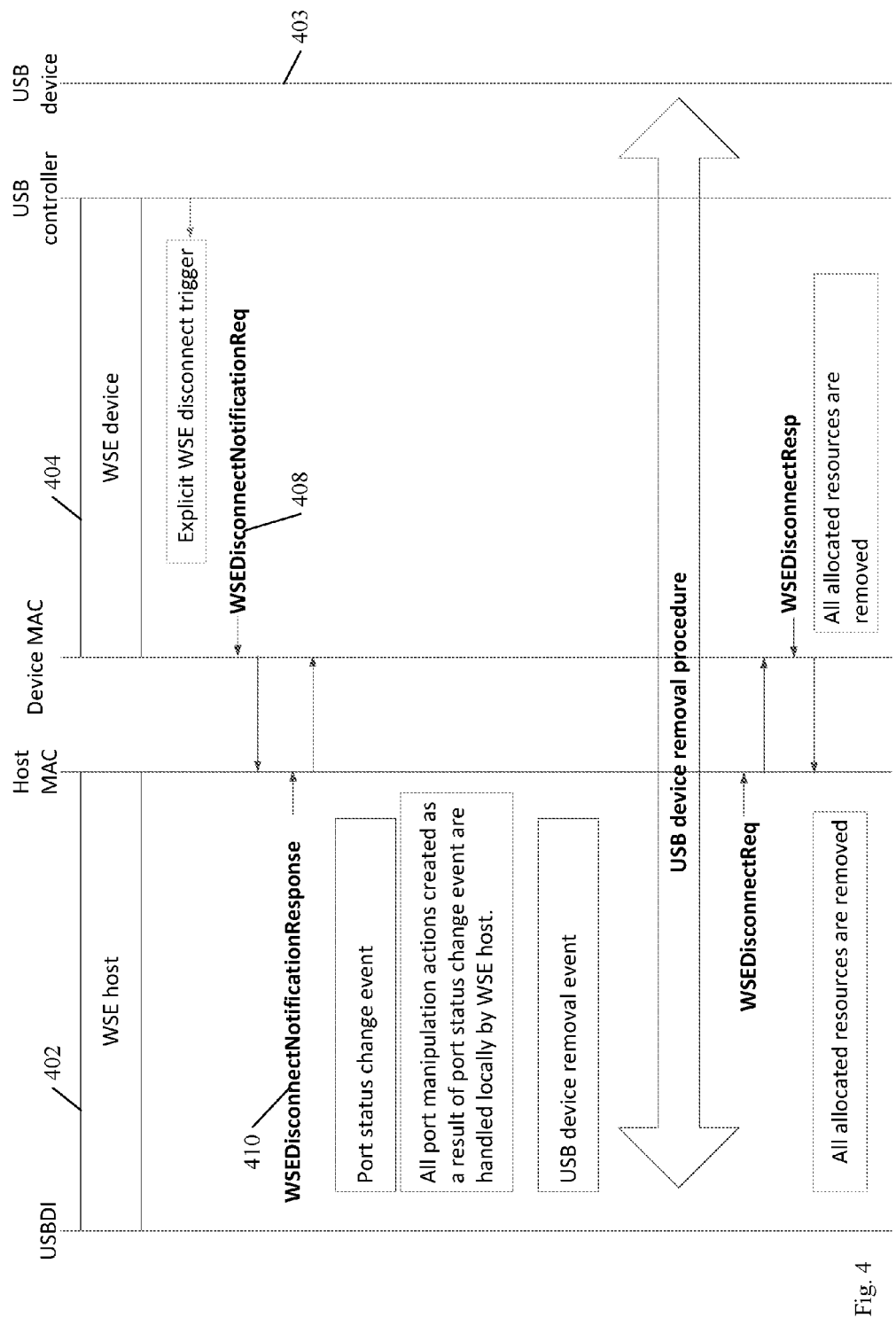
FIG. 4 schematically illustrates a device-initiated tear down mechanism, in accordance with some demonstrative embodiments.

FIG. 4 schematically illustrates a device-initiated tear down mechanism, in accordance with some demonstrative embodiments. For example, one or more operations of the mechanism of FIG. 4 may be performed by a WSE device 404 and/or a WSE host 402 to tear down a session between WSE host 402 and WSE device 404. For example, PAL communication unit 130 (FIG. 1) may perform the functionality of the WSE host 402 and/or PAL communication unit 131 (FIG. 1) may perform the functionality of the WSE device 404.

In some demonstrative embodiments, the device-initiated tear down may emulate and/or be equivalent to a user unplugging a USB device 403.

In some demonstrative embodiments, in the device initiated session tear down, WSE device 404 may notify WSE host 403 of the intention of WSE device 404 to dismantle the session.

In some demonstrative embodiments, WSE device 404 may transmit to WSE host 402 a Disconnect Notification Request message 408.

In some demonstrative embodiments, WSE host 402 may transmit to WSE device 404 a Disconnect Notification Response message 410, e.g., in response to the Disconnect Notification Request message 408.

In some demonstrative embodiments, WSE host 402 may initiate the session teardown, e.g., following the communication of the receipt of the Disconnect Notification Response message 408. For example, as shown in FIG. 4 WSE host 402 and/or WSE device 404 may perform one or more operations of the tear down procedure described above with reference to FIG. 3.

Figure 5:
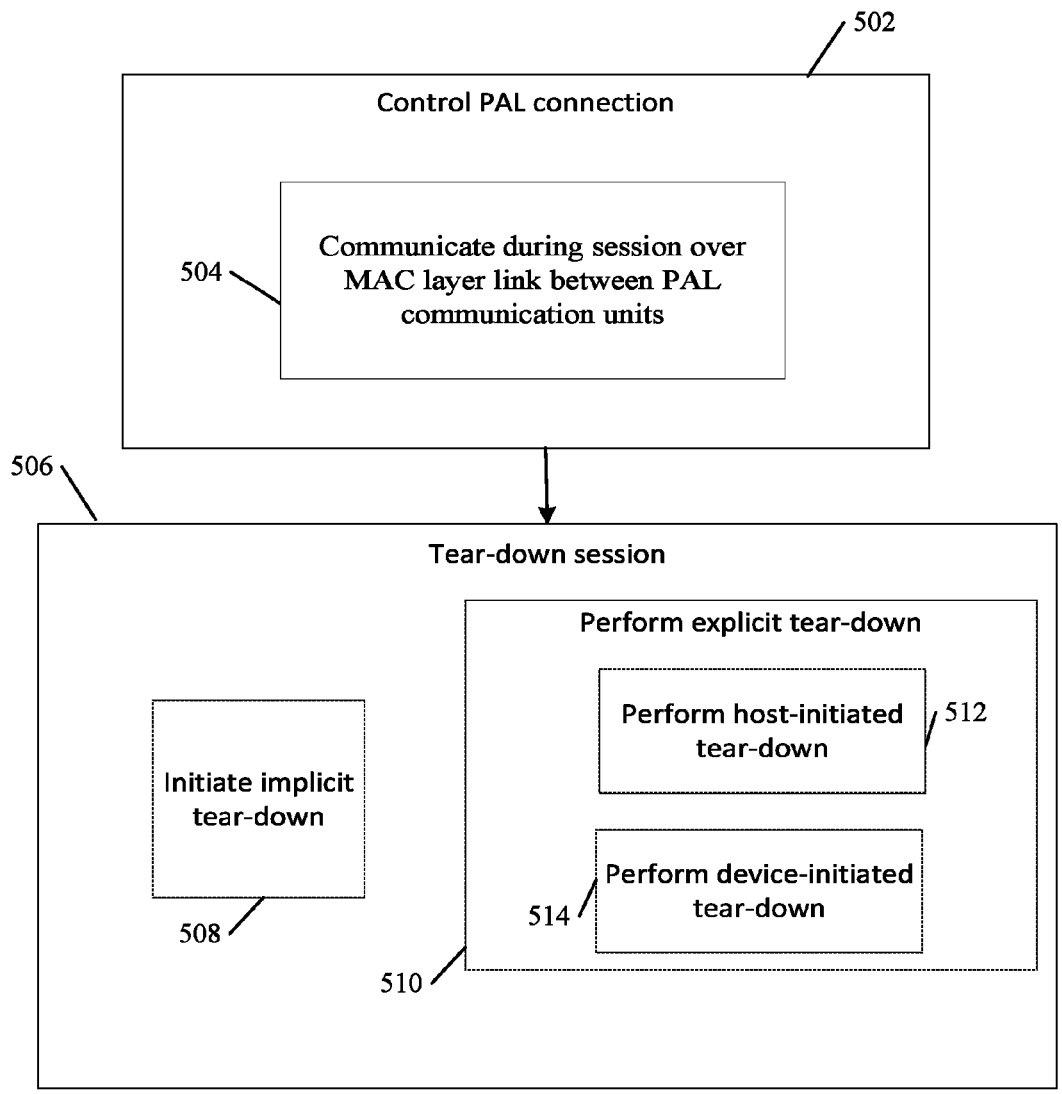
FIG. 5 schematically illustrates a method of tearing down a session, in accordance with some demonstrative embodiments.

Reference is made to FIG. 5, which schematically illustrates a method of tearing down a PAL session, in accordance with some demonstrative embodiments. In some embodiments, one or more of the operations of the method of FIG. 5 may be performed by a system, e.g., system 100 (FIG. 1); a device, e.g., device 102 (FIG. 1) and/or device 104 (FIG. 1); a PAL communication unit, e.g., PAL communication unit 130 (FIG. 1) and/or PAL communication unit 131 (FIG. 1); a WSE host, e.g., WSE host 202 (FIG. 2), WSE host 302 (FIG. 3) and/or WSE host 402 (FIG. 2); and/or a WSE device, e.g., WSE device 204 (FIG. 2), WSE device 304 (FIG. 3), and/or WSE device 404 (FIG. 4).

As indicated at block 502, the method may include controlling a PAL connection, over a PAL, between a first device and a second device.

As indicated at block 504, controlling the PAL connection may include communicating during a session over a communication link between a first PAL communication unit of the first device and a second PAL communication unit of the second device. For example, PAL communication units 130 (FIG. 1) and 131 (FIG. 1) may communicate over link 103 to control a PAL connection between device 102 (FIG. 1) and 104 (FIG. 1), e.g., as described above.

As indicated at block 506, the method may include tearing down the session according to a tear down procedure. For example, PAL communication unit 130 (FIG. 1) and/or PAL communication unit 131 (FIG. 1) may tear down the session, e.g., as described above.

As indicated at block 508, tearing down the session may include initiating an implicit tear down of the session responsive to a loss of connection over the communication link. For example, WSE host 202 (FIG. 2) and/or WSE device 204 (FIG. 2) may implicitly tear down the session, e.g., as described above with reference to FIG. 2.

As indicated at block 510, tearing down the session may include tearing down the session according to an explicit tear down procedure.

As indicated at block 512, tearing down the session according to the explicit tear down procedure may include tearing down the session according to a host-initiated explicit tear down procedure. For example, WSE host 302 (FIG. 3) and/or WSE device 304 (FIG. 3) may tear down the session according to the mechanism of FIG. 3.

As indicated at block 514, tearing down the session according to the explicit tear down procedure may include tearing down the session according to a device-initiated explicit tear down procedure. For example, WSE host 402 (FIG. 4) and/or WSE device 404 (FIG. 4) may tear down the session according to the mechanism of FIG. 4.

Figure 6:
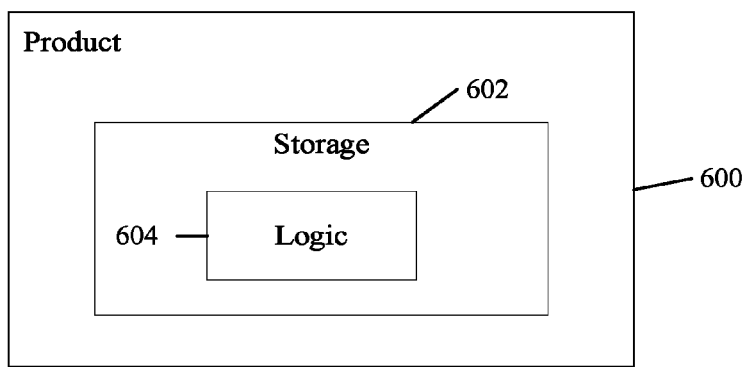
FIG. 6 is a schematic illustration of a product, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of device 102 (FIG. 1), device 104 (FIG. 1), PAL communication unit 130 (FIG. 1), and/or PAL communication unit 131 (FIG. 1), to perform one or more of the operations of the teardown mechanism of FIG. 2, FIG. 3 and/or FIG. 4, and/or to perform one or more operations of the method of FIG. 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM; programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 is an apparatus comprising a first Protocol Adaptation Layer (PAL) communication unit to control a PAL connection, over a PAL, between a first device and a second device, the first PAL communication unit is to control the PAL connection during a session with a second PAL communication unit over communication link, the PAL may be above a data link layer, wherein the first PAL communication unit is to tear down the session according to a tear down procedure.

Example 2 includes the subject matter of Example 1 and optionally, wherein the first PAL communication unit is to initiate an implicit tear down of the session responsive to a loss of connection over the communication link.

Example 3 includes the subject matter of Example 2 and optionally, wherein the first PAL communication unit is to emulate to the first device a disconnection between the first and second devices.

Example 4 includes the subject matter of Example 3 and optionally, wherein the first PAL communication unit is to locally handle actions from the first device resulting from the emulated disconnection.

Example 5 includes the subject matter of Example 3 or 4 and optionally, wherein the first PAL communication unit comprises a PAL host, the PAL host is to emulate to the first device an event representing a disconnection of the second device from the first device.

Example 6 includes the subject matter of Example 2 and optionally, wherein the first PAL communication unit comprises a Wireless-Gigabit (WiGig) Serial Extension (WSE) host, the WSE host is to emulate to a Universal-Serial Bus (USB) host an event representing a disconnection of a USB device.

Example 7 includes the subject matter of Example 6 and optionally, wherein the emulated event comprises an emulated port status change event equivalent to unplugging a wired USB device from a root port.

Example 8 includes the subject matter of Example 7 and optionally, wherein the WSE host is to locally handle port manipulation actions created as a result of the emulated port status change event.

Example 9 includes the subject matter of any one of Examples 6-8 and optionally, wherein the WSE host is to initiate a device removal event for removal of the USB device.

Example 10 includes the subject matter of Example 9 and optionally, wherein the WSE host is to locally handle actions resulting from the device removal event.

Example 11 includes the subject matter of Example 2 and optionally, wherein the first PAL communication unit comprises a Wireless-Gigabit (WiGig) Serial Extension (WSE) device, the WSE device is to emulate to a Universal-Serial Bus (USB) device an event representing a removal of the USB device.

Example 12 includes the subject matter of Example 11 and optionally, wherein the WSE device is to locally handle USB removal actions resulting from the emulated event.

Example 13 includes the subject matter of Example 2 and optionally, wherein the first PAL communication unit comprises a Wireless-Gigabit (WiGig) Serial Extension (WSE) host, the WSE host is to emulate to a Universal-Serial Bus (USB) host an event representing a disconnection of a USB device, wherein the emulated event comprises an emulated port status change event equivalent to unplugging a wired USB device from a root port, wherein the WSE host is to locally handle port manipulation actions created as a result of the emulated port status change event, wherein the WSE host is to initiate a device removal event for removal of the USB device, and wherein the WSE host is to locally handle actions resulting from the device removal event.

Example 14 includes the subject matter of Example 2 and optionally, wherein the first PAL communication unit comprises a Wireless-Gigabit (WiGig) Serial Extension (WSE) device, the WSE device is to emulate to a Universal-Serial Bus (USB) device an event representing a removal of the USB device, and wherein the WSE device is to locally handle USB removal actions resulting from the emulated event.

Example 15 includes the subject matter of any one of Examples 1-14 and optionally, wherein the tear down procedure comprises an explicit tear down procedure.

Example 16 includes the subject matter of Example 15 and optionally, wherein the first PAL communication unit is to communicate with the second PAL communication unit a disconnect request to explicitly terminate the session, and to communicate with the second PAL communication unit a disconnect response, the disconnect response in response to the disconnect request.

Example 17 includes the subject matter of Example 15 or 16 and optionally, wherein the first PAL communication unit comprises a Wireless-Gigabit (WiGig) Serial Extension (WSE) device, the WSE device is to receive from a WSE host a disconnect request to explicitly terminate the session, and to transmit to the WSE host a disconnect response, the disconnect response in response to the disconnect request.

Example 18 includes the subject matter of Example 15 or 16 and optionally, wherein the first PAL communication unit comprises a Wireless-Gigabit (WiGig) Serial Extension (WSE) host, the WSE host is to emulate to a Universal-Serial Bus (USB) host an event representing a disconnection of a USB device.

Example 19 includes the subject matter of Example 18 and optionally, wherein the emulated event comprises an emulated port status change event equivalent to unplugging a wired USB device from a root port.

Example 20 includes the subject matter of Example 19 and optionally, wherein the WSE host is to locally handle port manipulation actions created as a result of the emulated port status change event.

Example 21 includes the subject matter of Example 20 and optionally, wherein the WSE host is to initiate a device removal procedure for removal of the USB device.

Example 22 includes the subject matter of Example 15 or 16 and optionally, wherein the first PAL communication unit comprises a Wireless-Gigabit (WiGig) Serial Extension (WSE) host, the WSE host is to emulate to a Universal-Serial Bus (USB) host an event representing a disconnection of a USB, wherein the emulated event comprises an emulated port status change event equivalent to unplugging a wired USB device from a root port, wherein the WSE host is to locally handle port manipulation actions created as a result of the emulated port status change event, and wherein the WSE host is to initiate a device removal procedure for removal of the USB device.

Example 23 includes the subject matter of any one of Examples 18-22 and optionally, wherein the WSE host is to transmit to a WSE device a disconnect request to explicitly terminate the session, and to receive from the WSE device a disconnect response, the disconnect response in response to the disconnect request.

Example 24 includes the subject matter of any one of Examples 15-23 and optionally, wherein the explicit tear down procedure comprises a host initiated tear down procedure.

Example 25 includes the subject matter of any one of Examples 15-23 and optionally, wherein the explicit tear down procedure comprises a device initiated tear down procedure.

Example 26 includes the subject matter of Example 25 and optionally, wherein the first PAL communication unit comprises a Wireless-Gigabit (WiGig) Serial Extension (WSE) host, the WSE host is to receive a disconnect notification request from a WSE device, to transmit to the WSE device a disconnect notification response to acknowledge the disconnect notification request, and subsequent to communication of the disconnect notification response to emulate a port status change event to a Universal Serial Bus (USB) host.

Example 27 includes the subject matter of Example 25 and optionally, wherein the first PAL communication unit comprises a Wireless-Gigabit (WiGig) Serial Extension (WSE) device, and wherein subsequent to receiving an explicit WSE disconnect trigger, the WSE device is to transmit to a WSE host a disconnect notification request, and to receive from the WSE host a disconnect notification response to acknowledge the disconnect notification request.

Example 28 includes the subject matter of any one of Examples 1-27 and optionally, wherein the first PAL communication unit is to clear all resources allocated for the session.

Example 29 includes the subject matter of any one of Examples 1-28 and optionally, wherein the first PAL communication unit is to perform the functionality of Universal Serial Bus (USB) PAL selected from the group consisting of a host USB PAL and a device USB PAL.

Example 30 includes the subject matter of any one of Examples 1-29 and optionally, wherein the communication link comprises a wireless communication link, and the apparatus comprising at least one antenna to communicate over the wireless communication link.

Example 31 includes the subject matter of Example 30 and optionally, wherein the wireless communication link comprises a wireless gigabit (WiGig) link.

Example, 32 includes a product including a non-transitory storage medium having stored thereon instructions that, when executed by a machine, result in controlling a Protocol Adaptation Layer (PAL) connection, over a PAL, between a first device and a second device, the controlling comprises communicating during a session over a communication link between a first PAL communication unit of the first device and a second PAL communication unit of the second device, the PAL is above a data link layer; and tearing down the session according to a tear down procedure.

Example 33 includes the subject matter of Example 32 and optionally, Wherein tearing down the session comprises initiating an implicit tear down of the session responsive to a loss of connection over the communication link.

Example 34 includes the subject matter of Example 33 and optionally, wherein tearing down the session comprises emulating to the first device a disconnection between the first and second devices.

Example 35 includes the subject matter of Example 34 and optionally, wherein the instructions result in locally handling actions from the first device resulting from the emulated disconnection.

Example 36 includes the subject matter of Example 34 or 35 and optionally, wherein the first PAL communication unit comprises a PAL host, and wherein the emulating comprises emulating to the first device an event representing a disconnection of the second device from the first device.

Example 37 includes the subject matter of Example 33 and optionally, wherein the first PAL communication unit comprises a Wireless-Gigabit (WiGig) Serial Extension (WSE) host, and wherein tearing down the session comprises emulating to a Universal-Serial Bus (USB) host an event representing a disconnection of a USB device.

Example 38 includes the subject matter of Example 37 and optionally, wherein the emulated event comprises an emulated port status change event equivalent to unplugging a wired USB device from a root port.

Example 39 includes the subject matter of Example 38 and optionally, wherein the instructions result in locally handling port manipulation actions created as a result of the emulated port status change event.

Example 40 includes the subject matter of any one of Examples 37-39 and optionally, wherein the instructions result in initiating a device removal event for removal of the USB device.

Example 41 includes the subject matter of Example 40 and optionally, wherein the instructions result in locally handling actions resulting from the device removal event.

Example 42 includes the subject matter of Example 33 and optionally, wherein the first PAL communication unit comprises a Wireless-Gigabit (WiGig) Serial Extension (WSE) host, wherein tearing down the session comprises emulating to a Universal-Serial Bus (USB) host an event representing a disconnection of a USB device, and wherein the emulated event comprises an emulated port status change event equivalent to unplugging a wired USB device from a root port.

Example 43 includes the subject matter of Example 33 and optionally, wherein the first PAL communication unit comprises a Wireless-Gigabit (WiGig) Serial Extension (WSE) device, and wherein tearing down the session comprises emulating to a Universal-Serial Bus (USB) device an event representing a removal of the USB device.

Example 44 includes the subject matter of Example 43 and optionally, wherein the instructions result in locally handling by the WSE device USB removal actions resulting from the emulated event.

Example 45 includes the subject matter of Example 33 and optionally, wherein the first PAL communication unit comprises a Wireless-Gigabit (WiGig) Serial Extension (WSE) device, and wherein tearing down the session comprises emulating to a Universal-Serial Bus (USB) device an event representing a removal of the USB device, and locally handling by the WSE device USB removal actions resulting from the emulated event.

Example 46 includes the subject matter of Example 31 and optionally, wherein tearing down the session comprises tearing down the session according to an explicit tear down procedure, and wherein the instructions result in communicating between the first PAL communication unit and the second PAL communication unit a disconnect request to explicitly terminate the session, and communicating between the first PAL communication unit and the second PAL communication unit a disconnect response, the disconnect response in response to the disconnect request.

Example 47 includes the subject matter of Example 31 and optionally, wherein tearing down the session comprises tearing down the session according to an explicit tear down procedure.

Example 48 includes the subject matter of Example 47 and optionally, wherein the instructions result in communicating between the first PAL communication unit and the second PAL communication unit a disconnect request to explicitly terminate the session, and communicating between the first PAL communication unit and the second PAL communication unit a disconnect response, the disconnect response in response to the disconnect request.

Example 49 includes the subject matter of Example 47 and optionally, wherein the first PAL communication unit comprises a Wireless-Gigabit (WiGig) Serial Extension (WSE) device, the instructions result in receiving from a WSE host a disconnect request to explicitly terminate the session, and transmitting to the WSE host a disconnect response, the disconnect response in response to the disconnect request.

Example 50 includes the subject matter of Example 47 and optionally, wherein the first PAL communication unit comprises a Wireless-Gigabit (WiGig) Serial Extension (WSE) host, the instructions result in emulating to a Universal-Serial Bus (USB) host an event representing a disconnection of a USB device.

Example 51 includes the subject matter of Example 50 and optionally, wherein the emulated event comprises an emulated port status change event equivalent to unplugging a wired USB device from a root port.

Example 52 includes the subject matter of Example 51 and optionally, wherein the instructions result in locally handling port manipulation actions created as a result of the emulated port status change event.

Example 53 includes the subject matter of Example 52 and optionally, wherein the instructions result in initiating a device removal procedure for removal of the USB device.

Example 54 includes the subject matter of Example 47 and optionally, wherein the first PAL communication unit comprises a Wireless-Gigabit (WiGig) Serial Extension (WSE) host, the instructions result in emulating to a Universal-Serial Bus (USB) host an event representing a disconnection of a USB, wherein the emulated event comprises an emulated port status change event equivalent to unplugging a wired USB device from a root port, locally handling port manipulation actions created as a result of the emulated port status change event, and initiating a device removal procedure for removal of the USB device.

Example 55 includes the subject matter of any one of Examples 47-54 and optionally, wherein the explicit tear down procedure comprises a host initiated tear down procedure.

Example 56 includes the subject matter of any one of Examples 47-54 and optionally, wherein the explicit tear down procedure comprises a device initiated tear down procedure.

Example 57 includes the subject matter of Example 56 and optionally, wherein the first PAL communication unit comprises a Wireless-Gigabit (WiGig) Serial Extension (WSE) host, the instructions result in receiving by the WSE host a disconnect notification request from a WSE device, transmitting to the WSE device a disconnect notification response to acknowledge the disconnect notification request, and subsequent to communication of the disconnect notification response emulating a port status change event to a Universal Serial Bus (USB) host.

Example 58 includes the subject matter of Example 56 and optionally, wherein the first PAL communication unit comprises a Wireless-Gigabit (WiGig) Serial Extension (WSE) device, and wherein the instructions result in, subsequent to receiving an explicit WSE disconnect trigger, transmitting form the WSE device to a WSE host a disconnect notification request, and receiving from the WSE host a disconnect notification response to acknowledge the disconnect notification request.

Example 59 includes the subject matter of any one of Examples 32-58 and optionally, wherein the instructions result in the first PAL communication unit clearing all resources allocated for the session.

Example 60 includes the subject matter of any one of Examples 32-59 and optionally, wherein the first PAL communication unit is to perform the functionality of Universal Serial Bus (USB) PAL selected from the group consisting of a host USB PAL and a device USB PAL.

Example 61 includes the subject matter of any one of Examples 32-60 and optionally, wherein the communication link comprises a wireless communication link.

Example 62 includes the subject matter of Example 61 and optionally, wherein the wireless communication link comprises a wireless gigabit (WiGig) link.

Example 63 includes a communication method comprising controlling a Protocol Adaptation Layer (PAL) connection, over a PAL, between a first device and a second device, the controlling comprises communicating during a session over a communication link between a first PAL communication unit of the first device and a second PAL communication unit of the second device, the PAL is above a data link layer; and tearing down the session according to a tear down procedure.

Example 64 includes the subject matter of Example 63 and optionally, wherein tearing down the session comprises initiating an implicit tear down of the session responsive to a loss of connection over the communication link.

Example 65 includes the subject matter of Example 64 and optionally, wherein tearing down the session comprises emulating to the first device a disconnection between the first and second devices.

Example 66 includes the subject matter of Example 65 and optionally, comprising locally handling actions from the first device resulting from the emulated disconnection.

Example 67 includes the subject matter of Example 65 or 66 and optionally, wherein the first PAL communication unit comprises a PAL host, and wherein the emulating comprises emulating to the first device an event representing a disconnection of the second device from the first device.

Example 68 includes the subject matter of Example 64 and optionally, wherein the first PAL communication unit comprises a Wireless-Gigabit (WiGig) Serial Extension (WSE) host, and wherein tearing down the session comprises emulating to a Universal-Serial Bus (USB) host an event representing a disconnection of a USB device.

Example 69 includes the subject matter of Example 68 and optionally, wherein the emulated event comprises an emulated port status change event equivalent to unplugging a wired USB device from a root port.

Example 70 includes the subject matter of Example 69 and optionally, comprising locally handling port manipulation actions created as a result of the emulated port status change event.

Example 71 includes the subject matter of any one of Examples 68-70 and optionally, comprising initiating a device removal event for removal of the USB device.

Example 72 includes the subject matter of Example 71 and optionally, comprising locally handling actions resulting from the device removal event.

Example 73 includes the subject matter of Example 64 and optionally, wherein the first PAL communication unit comprises a Wireless-Gigabit (WiGig) Serial Extension (WSE) host, wherein tearing down the session comprises emulating to a Universal-Serial Bus (USB) host an event representing a disconnection of a USB device, and wherein the emulated event comprises an emulated port status change event equivalent to unplugging a wired USB device from a root port.

Example 74 includes the subject matter of Example 64 and optionally, wherein the first PAL communication unit comprises a Wireless-Gigabit (WiGig) Serial Extension (WSE) device, and wherein tearing down the session comprises emulating to a Universal-Serial Bus (USB) device an event representing a removal of the USB device.

Example 75 includes the subject matter of Example 74 and optionally, comprising locally handling by the WSE device USB removal actions resulting from the emulated event.

Example 76 includes the subject matter of Example 64 and optionally, wherein the first PAL communication unit comprises a Wireless-Gigabit (WiGig) Serial Extension (WSE) device, and wherein tearing down the session comprises emulating to a Universal-Serial Bus (USB) device an event representing a removal of the USB device, and locally handling by the WSE device USB removal actions resulting from the emulated event.

Example 77 includes the subject matter of Example 62 and optionally, wherein tearing down the session comprises tearing down the session according to an explicit tear down procedure, the explicit tear down procedure comprising communicating between the first PAL communication unit and the second PAL communication unit a disconnect request to explicitly terminate the session, and communicating between the first PAL communication unit and the second PAL communication unit a disconnect response, the disconnect response in response to the disconnect request.

Example 78 includes the subject matter of Example 62 and optionally, wherein tearing down the session comprises tearing down the session according to an explicit tear down procedure.

Example 79 includes the subject matter of Example 78 and optionally, comprising communicating between the first PAL communication unit and the second PAL communication unit a disconnect request to explicitly terminate the session, and communicating between the first PAL communication unit and the second PAL communication unit a disconnect response, the disconnect response in response to the disconnect request.

Example 80 includes the subject matter of Example 78 and optionally, wherein the first PAL communication unit comprises a Wireless-Gigabit (WiGig) Serial Extension (WSE) device, the method comprising receiving from a WSE host a disconnect request to explicitly terminate the session, and transmitting to the WSE host a disconnect response, the disconnect response in response to the disconnect request.

Example 81 includes the subject matter of Example 78 and optionally, wherein the first PAL communication unit comprises a Wireless-Gigabit (WiGig) Serial Extension (WSE) host, the method comprising emulating to a Universal-Serial Bus (USB) host an event representing a disconnection of a USB device.

Example 82 includes the subject matter of Example 81 and optionally, wherein the emulated event comprises an emulated port status change event equivalent to unplugging a wired USB device from a root port.

Example 83 includes the subject matter of Example 82 and optionally, comprising locally handling port manipulation actions created as a result of the emulated port status change event.

Example 84 includes the subject matter of Example 83 and optionally, comprising initiating a device removal procedure for removal of the USB device.

Example 85 includes the subject matter of Example 78 and optionally, wherein the first PAL communication unit comprises a Wireless-Gigabit (WiGig) Serial Extension (WSE) host, the method comprising emulating to a Universal-Serial Bus (USB) host an event representing a disconnection of a USB, wherein the emulated event comprises an emulated port status change event equivalent to unplugging a wired USB device from a root port, locally handling port manipulation actions created as a result of the emulated port status change event, and initiating a device removal procedure for removal of the USB device.

Example 86 includes the subject matter of any one of Examples 78-85 and optionally, wherein the explicit tear down procedure comprises a host initiated tear down procedure.

Example 87 includes the subject matter of any one of Examples 78-85 and optionally, wherein the explicit tear down procedure comprises a device initiated tear down procedure.

Example 88 includes the subject matter of Example 87 and optionally, wherein the first PAL communication unit comprises a Wireless-Gigabit (WiGig) Serial Extension (WSE) host, the method comprising receiving by the WSE host a disconnect notification request from a WSE device, transmitting to the WSE device a disconnect notification response to acknowledge the disconnect notification request, and subsequent to communication of the disconnect notification response emulating a port status change event to a Universal Serial Bus (USB) host.

Example 89 includes the subject matter of Example 87 and optionally, wherein the first PAL communication unit comprises a Wireless-Gigabit (WiGig) Serial Extension (WSE) device, the method comprising, subsequent to receiving an explicit WSE disconnect trigger, transmitting form the WSE device to a WSE host a disconnect notification request, and receiving from the WSE host a disconnect notification response to acknowledge the disconnect notification request.

Example 90 includes the subject matter of any one of Examples 63-89 and optionally, wherein the instructions result in the first PAL communication unit clearing all resources allocated for the session.

Example 91 includes the subject matter of any one of Examples 63-90 and optionally, wherein the first PAL communication unit is to perform the functionality of Universal Serial Bus (USB) PAL selected from the group consisting of a host USB PAL and a device USB PAL.

Example 92 includes the subject matter of any one of Examples 63-91 and optionally, wherein the communication link comprises a wireless communication link.

Example 93 includes the subject matter of Example 92 and optionally, wherein the wireless communication link comprises a wireless gigabit (WiGig) link.

Example 94 includes a method comprising controlling a Protocol Adaptation Layer (PAL) connection, over a PAL, between a first device and a second device, the controlling comprises communicating during a session over a communication link between a Wireless-Gigabit (WiGig) Serial Extension (WSE) host and a Wireless-Gigabit (WiGig) Serial Extension (WSE) device; and tearing down the session according to a tear down procedure.

Example 95 includes the subject matter of Example 94 and optionally, wherein tearing down the session comprises initiating an implicit tear down of the session responsive to a loss of connection between the WSE host and the WSE device, and wherein initiating the implicit tear down comprises emulating a disconnection between the first and second devices, and locally handling actions resulting from the emulated disconnection.

Example 96 includes the subject matter of Example 94 and optionally, wherein tearing down the session comprises tearing down the session according to an explicit tear down procedure selected from the group consisting of a host-initiated session tear down and a device-initiated session tear down.

Example 97 includes the subject matter of Example 96 and optionally, comprising communicating between the WSE host and the WSE device a disconnect request to explicitly terminate the session, and communicating between the WSE host and the WSE device a disconnect response, the disconnect response in response to the disconnect request.

Example 98 includes a wireless communication system comprising a Universal-Serial Bus (USB) host; and a Wireless-Gigabit (WiGig) Serial Extension (WSE) host to communicate with a WSE device during a WSE session to provide Protocol Adaptation Layer (PAL) connectivity between a first device and a second device over a communication link between the WSE host and WSE device, wherein the WSE host is to tear down the session according to a tear down procedure.

Example 99 includes the subject matter of Example 98 and optionally, wherein the WSE host is to emulate to the Universal-Serial Bus (USB) host an event representing a disconnection of a USB device, wherein the emulated event comprises an emulated port status change event equivalent to unplugging a wired USB device from a root port, wherein the WSE host is to locally handle port manipulation actions created as a result of the emulated port status change event, wherein the WSE host is to initiate a device removal event for removal of the USB device, and wherein the WSE host is to locally handle actions resulting from the device removal event.

Example 100 includes the subject matter of Example 98 and optionally, wherein the WSE host is to receive a disconnect notification request from the WSE device, and to transmit to the WSE device a disconnect notification response to acknowledge the disconnect notification request.

Example 101 includes a system comprising a Universal-Serial Bus (USB) device; and a Wireless-Gigabit (WiGig) Serial Extension (WSE) device to communicate with a WSE host during a WSE session to provide Protocol Adaptation Layer (PAL) connectivity between a first device and a second device over a communication link between the WSE host and WSE device, wherein the WSE device is to tear down the session according to a tear down procedure.

Example 102 includes the subject matter of Example 101 and optionally, wherein the WSE device is to emulate to the USB device an event representing a removal of the USB device, and wherein the WSE device is to locally handle USB removal actions resulting from the emulated event.

Example 103 includes the subject matter of Example 101 and optionally, wherein the WSE device is to receive from the WSE host a disconnect request to explicitly terminate the session, and to transmit to the WSE host a disconnect response, the disconnect response in response to the disconnect request.

Example 104 includes a communication apparatus comprising means for means for controlling a Protocol Adaptation Layer (PAL) connection, over a PAL, between a first device and a second device, the controlling comprises communicating during a session over a communication link between a first PAL communication unit of the first device and a second PAL communication unit of the second device, the PAL is above a data link layer; and means for tearing down the session according to a tear down procedure.

Example 105 includes the subject matter of Example 104 and optionally, wherein tearing down the session comprises initiating an implicit tear down of the session responsive to a loss of connection over the communication link.

Example 106 includes the subject matter of Example 104 and optionally, wherein tearing down the session comprises tearing down the session according to an explicit tear down procedure.

Example 107 includes the subject matter of Example 104 and optionally, wherein the explicit tear down procedure comprises a host initiated tear down procedure.

Example 108 includes the subject matter of Example 104 and optionally, wherein the explicit tear down procedure comprises a device initiated tear down procedure.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many variations, modifications, substitutions, changes, additions, improvements and equivalents may occur to those skilled in the art. It is, therefore, to be understood that the appended claims are intended to cover all such modifications and changes as fall within the true spirit of the invention.

What is claimed is:

1. An apparatus comprising a memory and a processor, the processor configured to cause a first media-agnostic Universal Serial Bus (USB) element of a media-agnostic USB Protocol Adaptation Layer (PAL) to:
    initiate an implicit session tear down of a media-agnostic USB session between the first media-agnostic USB element and a second media-agnostic USB element, based on a detected loss of connectivity between the first media-agnostic USB element and the second media-agnostic USB element;
    during the implicit session tear down, emulate a port status change event equivalent to unplugging a wired USB device from a root port;
    at the first media-agnostic USB element, locally handle actions resulting from the port status change event, and clear resources allocated to the media-agnostic USB session.

2. The apparatus of claim 1, wherein the first media-agnostic USB element comprises a media-agnostic USB host.

3. The apparatus of claim 2, wherein the processor is configured to cause the media-agnostic USB host to initiate a device removal event for removal of a USB device corresponding to the media-agnostic USB session.

4. The apparatus of claim 1, wherein the first media-agnostic USB element comprises a media-agnostic USB Device.

5. The apparatus of claim 1, wherein the media-agnostic USB PAL is configured to enable connectivity between a USB host and one or more USB devices.

6. The apparatus of claim 1, wherein the processor is configured to control a PAL connection, over the PAL, between a media-agnostic USB host and a media-agnostic USB device, said PAL is above a data link layer.

7. The apparatus of claim 1, wherein said media-agnostic USB session is over a wireless communication link.

8. The apparatus of claim 1 comprising a Media Access Control (MAC) component and a Physical Layer (PHY) component.

9. The apparatus of claim 1, wherein the media-agnostic USB element comprises a Wireless Gigabit (WiGig) Serial Extension (WSE) element of a WSE Protocol Adaptation Layer (PAL).

10. The apparatus of claim 1 comprising a radio.

11. The apparatus of claim 1 comprising a network interface.

12. The apparatus of claim 1 comprising at least one antenna.

13. A product comprising one or more tangible computer-readable non-transitory storage media comprising computer-executable instructions operable to, when executed by at least one processor, enable the at least one processor to cause a first media-agnostic Universal Serial Bus (USB) element of a media-agnostic USB Protocol Adaptation Layer (PAL) to:

initiate an implicit session tear down of a media-agnostic USB session between the first media-agnostic USB element and a second media-agnostic USB element, based on a detected loss of connectivity between the first media-agnostic USB element and the second media-agnostic USB element;

during the implicit session tear down, emulate a port status change event equivalent to unplugging a wired USB device from a root port;

at the first media-agnostic USB element, locally handle actions resulting from the port status change event; and clear resources allocated to the media-agnostic USB session.

14. The product of claim 13, wherein the first media-agnostic USB element comprises a media-agnostic USB host.

15. The product of claim 14, wherein the instructions, when executed, cause the first media-agnostic USB element to initiate a device removal event for removal of a USB device corresponding to the media-agnostic USB session.

16. The product of claim 13, wherein the first media-agnostic USB element comprises a media-agnostic USB Device.

17. The product of claim 13, wherein the media-agnostic USB PAL is configured to enable connectivity between a USB host and one or more USB devices.

18. The product of claim 13, wherein the instructions, when executed, cause the first media-agnostic USB element to control a PAL connection, over the PAL, between a media-agnostic USB host and a media-agnostic USB device, said PAL is above a data link layer.

19. The product of claim 13, wherein said media-agnostic USB session is over a wireless communication link.

20. The product of claim 13, wherein the media-agnostic USB element comprises a Wireless Gigabit (WiGig) Serial Extension (WSE) element of a WSE Protocol Adaptation Layer (PAL).

* * * * *